US011580791B2

United States Patent
Schow et al.

(10) Patent No.: US 11,580,791 B2
(45) Date of Patent: *Feb. 14, 2023

(54) AUTOMOBILE DAMAGE DETECTION USING THERMAL CONDUCTIVITY

(71) Applicant: CSAA INSURANCE SERVICES, INC., Walnut Creek, CA (US)

(72) Inventors: James Schow, Colorado Springs, CO (US); Abhay Gupta, Folsom, CA (US)

(73) Assignee: CSAA INSURANCE SERVICES, INC., Walnut Creek, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/500,550

(22) Filed: Oct. 13, 2021

(65) Prior Publication Data
US 2022/0036665 A1 Feb. 3, 2022

Related U.S. Application Data

(63) Continuation of application No. 16/231,161, filed on Dec. 21, 2018, now Pat. No. 11,176,761.

(51) Int. Cl.
*G07C 5/00* (2006.01)
*G06Q 10/10* (2012.01)
*G01N 27/18* (2006.01)
*G07C 5/08* (2006.01)
*G06Q 40/08* (2012.01)

(52) U.S. Cl.
CPC ............ *G07C 5/008* (2013.01); *G01N 27/185* (2013.01); *G06Q 10/10* (2013.01); *G06Q 40/08* (2013.01); *G07C 5/085* (2013.01); *G07C 5/0808* (2013.01); *G07C 5/0816* (2013.01)

(58) Field of Classification Search
CPC ...... G06Q 10/10; G06Q 40/08; G01N 27/185; G07C 5/0808; G07C 5/085; G07C 5/0816
USPC ........................................................ 701/31.5
See application file for complete search history.

(56) References Cited

U.S. PATENT DOCUMENTS

| 6,676,287 | B1 | 1/2004 | Mathis et al. |
| 9,721,400 | B1 | 8/2017 | Oakes, III et al. |
| 10,410,439 | B1 | 9/2019 | Gingrich et al. |
| 2003/0129082 | A1 | 7/2003 | Weinberg et al. |

(Continued)

*Primary Examiner* — Stephen S Hong
*Assistant Examiner* — Broderick C Anderson
(74) *Attorney, Agent, or Firm* — McDonnell Boehnen Hulbert & Berghoff LLP

(57) ABSTRACT

In one aspect, an example method includes (a) determining, via a thermal conductivity sensor of an automobile damage detection device, one or more thermal conductivities at one or more locations on an automobile; (b) transmitting, via a network interface of the automobile damage detection device, a request for anticipated thermal conductivity data from an automobile claims system, wherein the anticipated thermal conductivity data corresponds to anticipated thermal conductivities at the one or more locations on the automobile; (c) in response to transmitting the request, receiving, via the network interface from the automobile claims system, the anticipated thermal conductivity data; and (d) in response to receiving, from the automobile claims system, the anticipated thermal conductivity data, displaying, via a graphical user interface, a graphical representation of the determined one or more thermal conductivities and the anticipated thermal conductivity data.

20 Claims, 9 Drawing Sheets

(56) References Cited

U.S. PATENT DOCUMENTS

| | | |
|---|---|---|
| 2004/0226351 A1 | 11/2004 | Schafrik et al. |
| 2014/0201022 A1* | 7/2014 | Balzer .................. G06T 7/0002 |
| | | 705/26.4 |
| 2016/0364699 A1 | 12/2016 | Steketee et al. |
| 2017/0147613 A1 | 5/2017 | Nielsen et al. |

* cited by examiner

Thermal Conductivity Test

| Target Location #1 | | |
|---|---|---|
| Measured 116 (Btu/hr-ft-F) | Anticipated 118 (Btu/hr-ft-F) | Result Pass |
| Target Location #2 | | |
| Measured 119 (Btu/hr-ft-F) | Anticipated 118 (Btu/hr-ft-F) | Result Pass |
| Target Location #3 | | |
| Measured *REPEAT MEASUREMENT* | Anticipated 118 (Btu/hr-ft-F) | Result Inconclusive |

Figure 4B

Thermal Conductivity Test

Target Location #1

| Measured | Anticipated | Result |
|---|---|---|
| 116 (Btu/hr-ft-F) | 118 (Btu/hr-ft-F) | Pass |

Target Location #2

| Measured | Anticipated | Result |
|---|---|---|
| 119 (Btu/hr-ft-F) | 118 (Btu/hr-ft-F) | Pass |

Target Location #3

| Measured | Anticipated | Result |
|---|---|---|
| 116 (Btu/hr-ft-F) | 118 (Btu/hr-ft-F) | Pass |

Figure 4C

# AUTOMOBILE DAMAGE DETECTION USING THERMAL CONDUCTIVITY

CROSS REFERENCE TO RELATED APPLICATIONS

The present application is a continuation of U.S. patent application Ser. No. 16/231,161 filed Dec. 21, 2018, which is herewith incorporated by reference into the present application.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example automobile damage detection device is disclosed. The automobile damage detection device comprises (a) a thermal conductivity sensor; (b) a network interface; (c) a graphical user interface; (d) one or more processors; and (e) a non-transitory, computer-readable medium storing instructions that, when executed by the one or more processors, cause the automobile damage detection device to perform a set of acts comprising: (i) determining, via the thermal conductivity sensor, one or more thermal conductivities at one or more locations on an automobile; (ii) transmitting, via the network interface, a request for anticipated thermal conductivity data from an automobile claims system, wherein the anticipated thermal conductivity data corresponds to anticipated thermal conductivities at the one or more locations on the automobile; (iii) in response to transmitting the request, receiving, via the network interface from the automobile claims system, the anticipated thermal conductivity data; and (iv) in response to receiving, from the automobile claims system, the anticipated thermal conductivity data, displaying, via the graphical user interface, a graphical representation of the determined one or more thermal conductivities and the anticipated thermal conductivity data, wherein the graphical representation comprises a comparison of the determined one or more thermal conductivities and the anticipated thermal conductivity data.

In another aspect, an example method is disclosed. The method includes (a) determining, via a thermal conductivity sensor of an automobile damage detection device, one or more thermal conductivities at one or more locations on an automobile; (b) transmitting, via a network interface of the automobile damage detection device, a request for anticipated thermal conductivity data from an automobile claims system, wherein the anticipated thermal conductivity data corresponds to anticipated thermal conductivities at the one or more locations on the automobile; (c) in response to transmitting the request, receiving, via the network interface from the automobile claims system, the anticipated thermal conductivity data; and (d) in response to receiving, from the automobile claims system, the anticipated thermal conductivity data, displaying, via a graphical user interface of the automobile damage detection device, a graphical representation of the determined one or more thermal conductivities and the anticipated thermal conductivity data, wherein the graphical representation comprises a comparison of the determined one or more thermal conductivities and the anticipated thermal conductivity data.

In another aspect, an example non-transitory computer-readable medium is disclosed. The computer-readable medium has stored thereon program instructions that, upon execution by a computing system, cause the computing system to perform a set of operations comprising (a) determining, via a thermal conductivity sensor, one or more thermal conductivities at one or more locations on an automobile; (b) transmitting, via a network interface, a request for anticipated thermal conductivity data from an automobile claims system, wherein the anticipated thermal conductivity data corresponds to anticipated thermal conductivities at the one or more locations on the automobile; (c) in response to transmitting the request, receiving, via the network interface from the automobile claims system, the anticipated thermal conductivity data; and (d) in response to receiving, from the automobile claims system, the anticipated thermal conductivity data, displaying, via a graphical user interface, a graphical representation of the determined one or more thermal conductivities and the anticipated thermal conductivity data, wherein the graphical representation comprises a comparison of the determined one or more thermal conductivities and the anticipated thermal conductivity data.

BRIEF DESCRIPTION OF THE DRAWINGS

FIG. 4B is the example graphical user interface of FIG. 4A, but in a second state.

FIG. 4C is the example graphical user interface of FIG. 4A, but in a third state.

DETAILED DESCRIPTION

I. Overview

Figure 1:
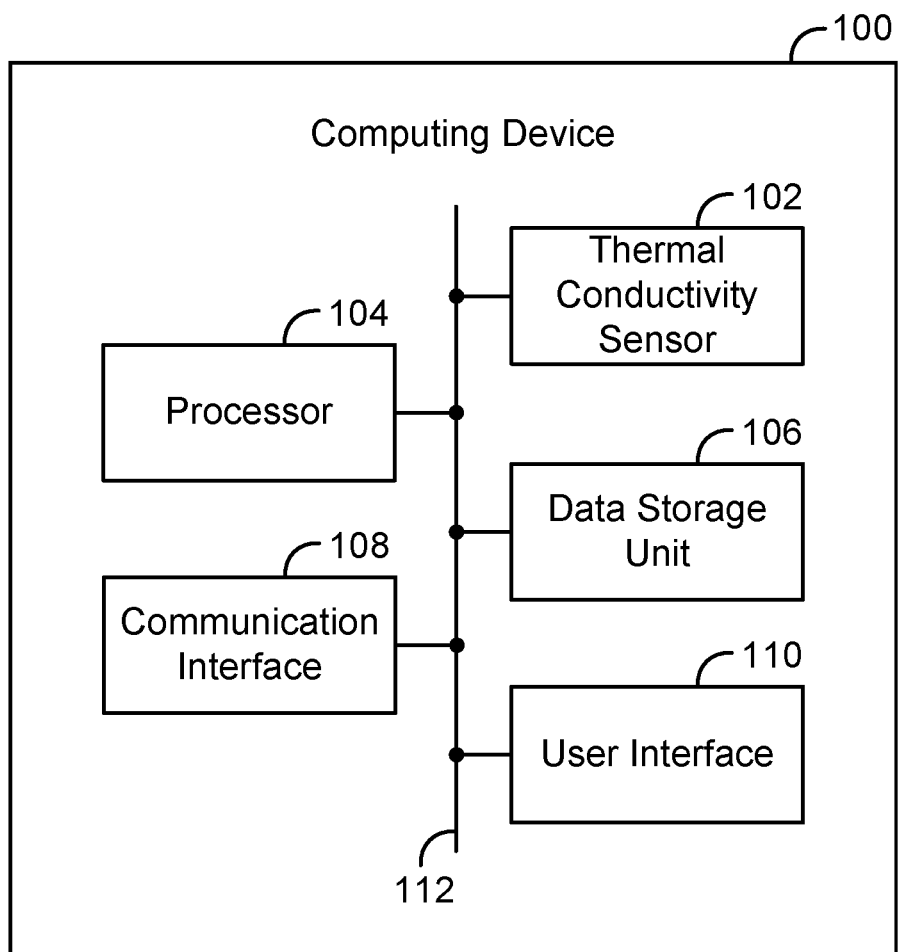
FIG. 1 is a simplified block diagram of an example computing device.

When evaluating insurance claims or other customer requests associated with previous, existing, or potential insurance policies, insurance companies may assess the extent of damage to an automobile. Further, an insurance company can evaluate these requests and make these assessments in various contexts. For example, an assessment may include assessing the extent of damage to an automobile before a policy is issued, when a customer seeks to change a policy attribute (e.g., increase property damage limitations), when a claim is submitted under the policy, or any combination of the above.

An insurance company can assess an automobile in various ways. For example, to get an assessment of an automobile's value, insurance companies may rely on one or more automobile service professionals to assess the extent of damage to an automobile at various stages relating to an insurance policy. For example, the insurance company may perform this assessment before issuing a policy (e.g., when assessing the automobile's value at the policy's inception, perhaps by an employee of the insurance company (for example, an underwriter)).

In another example, the insurance company may perform this assessment when determining whether to modify a policy attribute (e.g., when assessing the automobile's value when there is a change in the policy, again, perhaps by an employee of the insurance company (for example, an underwriter)). In yet another example, the insurance company may perform this assessment when determining whether (and how much) to pay for a submitted claim (e.g., assessing the automobile's value when deciding whether to pay a claim under the policy, perhaps by an employee or independent working for the insurance company (for example, a claims adjuster)).

Relying on various service professionals and employees to perform these assessments at various points of customer interaction using current methods, however, can have disadvantageous results for the insurance company (e.g., increased costs and/or inconsistent results between insurance and automotive repair professionals). Furthermore, incorrectly assessing a vehicle may create undesirable results for the insurance company (e.g., paying excess claims).

For example, if an insurance company representative (e.g., a field agent) assesses a vehicle's value without the benefit of real-time assessment of the vehicle's actual versus apparent condition (e.g., the vehicle may appear to have original body panels but may actually have damaged body panels with resin fillers), the insurance company may pay too much under a claim.

If, however, the insurance company could more efficiently assess an automobile's damage before these disadvantageous results occurred, then the insurance company could benefit from additional advantages during the life of the policy, potentially without having to rely on different (or any) automobile service professionals. And, the faster, cheaper, and more accurately and consistently the detection of this damage occurs, the better the insurance company could fare under the policy.

To address these concerns, one approach may include detecting, by an automobile damage detection device, one or more thermal conductivity measurements at various areas on an automobile and comparing those detected measurements to one or more expected thermal conductivities for those areas. For example, during this detection process, the device may detect respective thermal conductivities at various areas on an automobile (e.g., a fender) and compare them to a predetermined or otherwise known range of thermal conductivities for those areas on that automobile (e.g., known thermal conductivities at discrete areas on that particular automobile's fender) or for materials typically used in fenders or in automobiles, generally, among other possibilities.

Embodiments of the present disclosure provide devices, systems, and methods for improving these assessments by collecting data and information associated with an automobile and then comparing that data with data and information previously collected for that automobile or associated with an automobile that shares one or more attributes with that automobile (e.g., same make, model, manufacturer, year, and/or edition). By comparing this data and information, the insurance company may more accurately understand and determine actions to be taken when underwriting and/or performing under a policy, as well as other policies.

More specifically, example embodiments relate to methods, systems, and devices that allow insurance companies to assess the extent of damage to an automobile based on one or more thermal conductivity measurements determined at one or more areas on an automobile and comparing those measurements to known thermal conductivity data. In this way, damage to the automobile may be more accurately assessed by identifying different materials used to repair the automobile (e.g., damage repaired with non-original materials). In a further aspect, the known thermal conductivity data may have been previously collected in connection with that specific vehicle, in connection with a similar vehicle, or both, among other possibilities.

For example, when determining whether to pay a claim relating to an insurance policy, an insurance company may send an agent to evaluate the extent of damage to an automobile. The agent may use various tools to assist this evaluation, one of which may include an automobile damage detection device that includes, among other things, a thermal conductivity sensor, a graphical user interface, and a network interface that allows the device to communicate with other devices (e.g., a server containing information relating to that automobile and/or others).

In some examples, the device may detect and measure the thermal conductivity of various areas on the automobile (e.g., various areas on a particular damaged fender) using a thermal conductivity sensor. In one example, this sensor may apply heat to a contact area using an electrically powered heating element and may measure how much power is required to heat the contact area by a particular amount or rate. Based on this measurement, the sensor may determine the thermal conductivity of the material at that area on the automobile.

In some examples, this measurement may be made using direct contact between the thermal conductivity sensor and the automobile. In other examples, however, this measurement may be made using indirect contact between the thermal conductivity sensor and the automobile. For example, a casing made of a particular material may encompass the sensor, the device, or both in order to reduce damage caused by direct contact between the sensor and the automobile (e.g., scratching the automobile and/or scorching the paint). In another example, a particular material could be applied to the automobile or the sensor (e.g., a wax and/or inert lubricant) to help prevent direct contact between the sensor and the automobile.

In yet another example, the thermal conductivity sensors may include or be in close proximity to one or more magnets that prevent the sensor from making direct contact with the automobile, but that still allow the sensor to detect the thermal conductivity of an underlying area on the automobile. In one example, this sensor may also include non-contact mechanisms for measuring and calculating thermal conductivity of the automobile material (e.g., an infrared thermometer and/or one or more lasers used for laser flash diffusivity).

Under any of these circumstances, however, the device and/or sensors may also be configured to determine a type and extent of material between the sensor and the automobile and to also compensate accordingly when determining the thermal conductivity of the underlying area on the automobile.

In yet another example, before the detection and measurement of these thermal conductivities on the automobile, the device may display, via a graphical user interface, instructions for conducting the thermal conductivity measurements.

Furthermore, after the device has determined the thermal conductivities at one or more areas on the automobile, the device may store the determined thermal conductivities and/or transmit a request for anticipated thermal conductivity data corresponding to these thermal conductivity measurements. In one example, the device may request this anticipated thermal conductivity data from an automobile claims system containing such data. In one example, this data may include previously measured thermal conductivities for the same automobile (and potentially even the same thermal conductivities measured at those areas on the same automobile). In other examples, however, this data may include previously determined thermal conductivities for one or more similar automobiles (e.g., another automobile of the same model, make, and year).

Furthermore, to improve the correlation between the anticipated thermal conductivity data and the determined thermal conductivities, the request may contain information indicating one or more attributes of the automobile being assessed for damage (e.g., the policy number for the automobile, pictures of the automobile, manufacturing details of the automobile, and/or the vehicle identification number of the automobile).

In response to this request, the device may receive the anticipated thermal conductivity data corresponding to the determined thermal conductivities and responsively display a graphical representation via a graphical user interface of the device comparing the two. In one example, as illustrated below, the device may display an ordered list that displays various results of the comparison. For example, the graphical user interface may display the determined thermal conductivities of three target locations on the automobile, as well as the anticipated results of those measurements and whether they comport with one or more established protocols for comparing the two (e.g., indicating whether the determined thermal conductivity falls within a certain tolerance of the anticipated thermal conductivity (for example, ±5% of the anticipated thermal conductivity)).

Other graphical representations of this information and comparison are also possible (e.g., a map of the one or more areas on the automobile at which the thermal conductivity measurements were taken and/or an indication on the map of whether the results at those areas comport with the established protocol).

In still other examples, the device may detect that, based on the anticipated thermal conductivity data, the determined thermal conductivities are not sufficient to adequately compare the two types of data (e.g., the device may realize that three thermal conductivity measurements were attempted at various areas on the automobile, but only two successfully measured the thermal conductivity of the intended areas). In response, as illustrated below, the device may display an alternative view comparing the various results of the determined thermal conductivities and the corresponding anticipated thermal conductivity data.

For example, the graphical user interface may display the determined thermal conductivities of two successfully measured target locations on the automobile, as well as the anticipated results of those measurements and whether the measurements comport with one or more established protocols. However, the graphical user interface may also display follow-up instructions for conducting one or more additional thermal conductivity measurements at one or more areas on the automobile, as well as the anticipated results of those measurements. Further, the graphical user interface may indicate that the comparison is inconclusive for determining compliance with the one or more established protocols until a follow-up measurement is undertaken. Other responsive actions are also possible, many of which are discussed in further detail below.

Additionally, the device may then determine, via the thermal conductivity sensor, one or more additional thermal conductivities measured at areas on the automobile to account for the previously inconclusive result. In another example, the device may responsively display an updated graphical representation comparing the originally and additionally determined thermal conductivities to the received thermal conductivity data and provide updated results based thereon.

These devices, systems, and methods may provide technical advantages and improve automobile damage assessments by increasing an accuracy of an assessment and/or decreasing an amount of time taken to perform the assessment.

II. Example Architecture

A. Computing Device

FIG. 1 is a simplified block diagram of an example computing device 100. The computing device 100 can be configured to perform and/or can perform one or more acts and/or functions, such as those described in this disclosure. The computing device 100 can include various components, such as a thermal conductivity sensor 102, a processor 104, a data storage unit 106, a communication interface 108, and/or a user interface 110. Each of these components can be connected to each other via a connection mechanism 112.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The thermal conductivity sensor 102 can include thermal conductivity sensors now known or later developed, including but not limited to a contact-based thermal conductivity sensor (e.g., a transient plane source sensor, which may include utilizing a plane sensor and one or more specific mathematical models to measure thermal conductivity), a non-contact-based thermal conductivity sensor (e.g., a pulse laser and/or infrared thermometer used to perform one or more laser flash diffusivity methods to measure thermal conductivity), and/or a combination of the two, among other possibilities.

The processor 104 can include a general-purpose processor (e.g., a microprocessor) and/or a special-purpose processor (e.g., a digital signal processor (DSP)). The processor 104 can execute program instructions included in the data storage unit 106 as discussed below.

The data storage unit 106 can include one or more volatile, non-volatile, removable, and/or non-removable storage components, such as magnetic, optical, and/or flash storage, and/or can be integrated in whole or in part with the processor 104. Further, the data storage unit 106 can take the form of a non-transitory computer-readable storage medium, having stored thereon program instructions (e.g., compiled or non-compiled program logic and/or machine code) that, upon execution by the processor 104, cause the computing device 100 to perform one or more acts and/or functions, such as those described in this disclosure. These program instructions can define, and/or be part of, a discrete software application. In some instances, the computing device 100 can execute program instructions in response to receiving an input, such as an input received via the communication interface 108 and/or the user interface 110. The data storage unit 106 can also store other types of data, such as those types described in this disclosure.

The communication interface 108 can allow the computing device 100 to connect with and/or communicate with another entity, such as another computing device, according to one or more protocols. In one example, the communication interface 108 can be a wired interface, such as an Ethernet interface. In another example, the communication interface 108 can be a wireless interface, such as a cellular or WI-FI interface. In this disclosure, a connection can be a direct connection or an indirect connection, the latter being a connection that passes through and/or traverses one or more entities, such as a router, switch, or other network device. Likewise, in this disclosure, a transmission can be a direct transmission or an indirect transmission.

The user interface 110 can include hardware and/or software components that facilitate interaction between the computing device 100 and a user of the computing device 100, if applicable. As such, the user interface 110 can include input components such as a keyboard, a keypad, a mouse, a touch-sensitive panel, and/or a microphone, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, and/or a mobile phone. In a further aspect, the features described herein may involve some or all of these components arranged in different ways, including additional or fewer components and/or different types of components, among other possibilities.

B. Automobile Damage Detection Device

Figure 2:
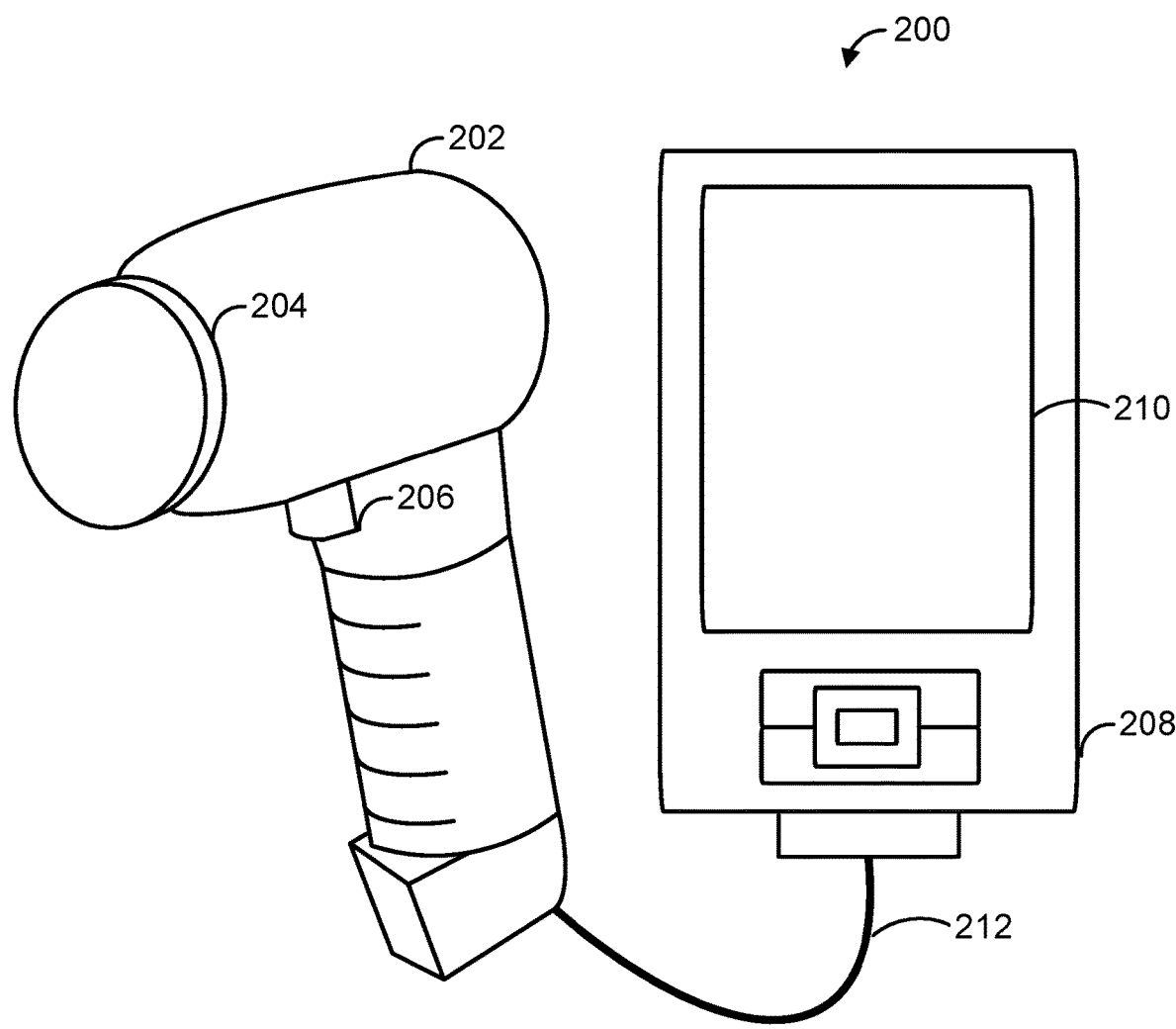
FIG. 2 is an example automobile damage detection device.

FIG. 2 is an example automobile damage detection device 200. The automobile damage detection device 200 can perform various acts and/or functions related to detecting automobile damage, and can be implemented as a computing system. In this disclosure, the term "computing system" means a system that includes at least one computing device, such as computing device 100. In some instances, a computing system can include one or more other computing systems.

It should also be readily understood that computing device 100, automobile damage detection device 200, and any of the components thereof, can be physical systems made up of physical devices, cloud-based systems made up of cloud-based devices that store program logic and/or data of cloud-based applications and/or services (e.g., for performing at least one function of a software application or an application platform for computing systems and devices detailed herein), or some combination of the two.

In any event, the automobile damage detection device 200 can include various components, such as a damage detection sensor 202 that includes one or more thermal conductivity sensors 204, an activation mechanism 206, and a damage detection communication device 208 with a damage detection graphical user interface 210, each of which can be implemented as a computing system or part of a computing system.

The automobile damage detection device 200 can also include a connection mechanism 212, which connects the damage detection sensor 202 with the damage detection communication device 208. In this manner, the damage detection sensor 202 and the damage detection communication device 208 can communicate data via the connection mechanism 212.

In practice, the damage detection communication device 208 can allow the user to communicate with an automobile claims system via a network interface and can communicate various types of data that can be used for detecting and analyzing automobile damage. For example, the damage detection communication device 208 may send a request to a database for anticipated thermal conductivity data corresponding to the anticipated thermal conductivities at the one or more locations on the automobile. In response to this request, damage detection communication device 208 may also receive this requested data from the database. The database may include any of a variety of sources (e.g., an automobile claims system with databases containing this requested information, specialized support entities relating to various insurance policies containing similar information, and so on).

The damage detection sensor 202 can take various forms. For example, the damage detection sensor 202 can be a handheld mobile device as depicted in FIG. 2 or a stationary fixture with articulating components (e.g., a ground-mounted fixture with components that may be repositioned, manually or automatically).

The damage detection sensor 202 can also perform various operations related to detecting damage on an automobile using various components. For example, the damage detection sensor 202 may include one or more thermal conductivity sensors 204 and an activation mechanism 206 used to activate the damage detection sensor 202 to detect damage on the automobile.

In one example, the one or more thermal conductivity sensors 204 may include one or more contact-based thermal conductivity sensors. For example, the one or more thermal conductivity sensors 204 may include an electrically powered heating element and may measure how much power is required to heat a target location (e.g., the area of contact between the one or more sensors and the automobile's surface) by a particular amount or rate. In another aspect, the thermal conductivity sensors 204 may include a sensor to measure the thermal conductivity of the material at the contact area using a transient plane source method and/or a modified transient plane source method (MTPSM), among other possibilities. The data collected using the thermal conductivity sensors 204 can be used in connection with one or more specific mathematical models to determine the thermal conductivity of the material at any area of direct contact on the automobile.

In other examples, however, the one or more thermal conductivity sensors 204 may include one or more indirect-contact-based thermal conductivity sensors. For example, the one or more thermal conductivity sensors 204 may include one or more of the direct contact sensors discussed above but may also contain an encapsulating casing made of a particular material surrounding the thermal conductivity sensors. In other examples, this casing may cover the entire damage detection sensor 202. Either way, such a casing can be used to reduce damage potentially caused by direct contact between the one or more thermal conductivity sensors 204 and the automobile (e.g., scratching the automobile and/or burning the paint). In another example, one or more particular materials can be applied to the automobile or the sensor (e.g., a wax and/or an inert lubricant) to help prevent direct contact between the sensor and the automobile.

In any case, after indirect-contact data is collected using these thermal conductivity sensors 204, one or more specific mathematical models may allow the determination of thermal conductivity of the material at any area of indirect contact on the automobile. For instance, the automobile damage detection device 200 may use a mathematical model that accounts for the presence of the casing or the applied materials on the thermal conductivity sensor 204 when determining the thermal conductivity of the automobile material. To facilitate this, the damage detection sensor 202 may also determine a type and extent of material between the sensor and the automobile and compensate accordingly when determining the thermal conductivity of the underlying contact area on the automobile.

In yet another example, the one or more thermal conductivity sensors 204 may include one or more non-contact-based thermal conductivity sensors that are used to determine thermal conductivity at various areas on the automobile without making direct or indirect contact with the material itself. For example, the one or more thermal conductivity sensors 204 may include one or more non-contact-based sensors (e.g., infrared thermometers, lasers, pulse lasers, and/or cameras) used to measure thermal conductivity using one or more specific mathematical models (e.g., calculating thermal conductivity from thermal diffusivity obtained using laser flash methods).

In a further aspect, more than one non-contact-based thermal conductivity sensor may be used and may be of the same type (e.g., multiple lasers to measure thermal conductivities in multiple instances around the same target location on the automobile). In other examples, however, these multiple non-contact-based thermal conductivity sensors may be of different types and/or may provide different functionalities in measuring thermal conductivities at various areas (e.g., one laser could be used to heat up a target location on the automobile and another could be used to measure a thermal conductivity at that target location).

In a further aspect, one or more additional components can be integrated into the damage detection sensor 202, the one or more thermal conductivity sensors 204, or both in order to improve data collection. For example, one or more magnets may be integrated into the damage detection sensor 202, the one or more thermal conductivity sensors 204, or both to facilitate using the thermal conductivity sensors 204, the damage detection sensor 202, or both in close proximity to the target locations on the automobile being measured, while also preventing the sensor(s) from making direct contact with the automobile. In a further aspect, these one or more magnets may also be used to collect data that can be used in determining the material at the target location on the automobile (e.g., by detecting (and potentially measuring the strength of) an underlying magnetic field (for example, iron or steel) or lack thereof (for example, resin, plastic, or aluminum)). In a further aspect, alternative non-contact-based sensors can use x-ray methods in determining the material at the target location of an automobile. In such examples, based on the identified material, these additional components can then also be used to determine a thermal conductivity of the material.

In another example, the damage detection sensor 202 may include an activation mechanism 206 that can be used to control and/or activate the one or more thermal conductivity sensors 204 on the damage detection sensor 202. For example, the activation mechanism 206 may function as a switch that, when activated (shown here as trigger mechanism), causes the damage detection sensor 202 to activate the one or more thermal conductivity sensors 204 to measure thermal conductivity at the target location on the automobile (e.g., by heating an electrical element in the thermal conductivity sensor 204 and measuring the thermal conductivity of the material at the target location). In some examples, activation of the damage detection sensor 202 and the one or more thermal conductivity sensors 204 may be temporary (e.g., for a predetermined duration after activating the activation mechanism 206 or only while activating the activation mechanism 206), which may help conserve device resources (e.g., in battery powered devices, maintaining longer battery life). Furthermore, by utilizing a temporary activation mechanism 206, the activation of the damage detection sensor 202, the one or more thermal conductivity sensors 204, or both could be limited to times when the user actually intends to take thermal conductivity measurements, potentially resulting in more accurate and intentional measurements.

Under any of these circumstances, however, data collected using the damage detection sensor 202 can be sent to the damage detection communication device 208 for further processing. In one example, the damage detection communication device 208 may include one or more processors configured to calculate thermal conductivity using one or more specific mathematical models. Based on this calculation, the damage detection communication device 208 may also compare the calculated thermal conductivity of the material at that area (and other areas) on the automobile to an anticipated thermal conductivity for that area (and other areas) on the automobile pursuant to various protocols, a few examples of which are detailed below.

For example, the damage detection communication device 208 may request, access, compile, and/or assess thermal conductivity data associated with a particular target location on the automobile (e.g., thermal conductivity data previously measured at that particular target location on that particular automobile), similar automobiles (e.g., thermal conductivity data previously measured at that target location on a similar automobile having one or more attributes in common with the automobile), or both, among other possibilities. In a further aspect, this thermal conductivity data may be compiled and assessed by the damage detection communication device 208 before the automobile damage detection device 200 is used to detect the damage on the automobile (e.g., the damage detection communication device 208 may be preloaded with anticipated thermal conductivities for all makes and models of automobiles manufactured within a particular time period, such as from 2015 to the present).

The anticipated thermal conductivity data may also be compiled and assessed by the damage detection communication device 208 in connection with other insurance data, including, for example, data received from the policyholder in connection with the automobile covered by a particular policy, or similar automobiles covered by other policies.

In still other examples, the damage detection communication device 208 may obtain the anticipated thermal conductivity data from other sources (e.g., databases maintained by the insurance company containing specific policyholder records and/or policy information, an automobile claims system with databases containing the requested information, specialized support entities relating to various insurance policies containing similar information, and/or third-party sources (for example, databases containing automobile manufacturing specifications, and/or internet search engines), among other such sources).

Under any of these circumstances, after both the thermal conductivity data is determined for target locations of the automobile and the anticipated thermal conductivity data is received for those same target locations, the damage detection communication device 208 may compare the two sets of data and display a comparison of the determined one or more thermal conductivities and the anticipated thermal conductivity data via the damage detection graphical user interface 210. In one example, the comparison may involve displaying an ordered list comparing the determined one or more thermal conductivities and the anticipated thermal conductivity data.

Depending on the results of the comparison, the ordered list displayed via the damage detection graphical user interface 210 may indicate to the user that the thermal conductivities of the materials measured at the target locations on the automobile were as expected (e.g., indicating that the determined thermal conductivities are the same as (or within a particular threshold of) the anticipated thermal conductivities for those target locations). In a further aspect, in accordance with example embodiments, one or more of several responsive actions may be taken by the automobile damage detection device 200. For example, the automobile damage detection device 200 may store (locally and/or remotely) the results of the measurements and/or send them to another entity or entities for further processing (e.g., by the automobile claims system). In another example, based on the determined thermal conductivities being sufficiently similar to the anticipated thermal conductivities for those locations (e.g., deviating from the anticipated thermal conductivities by less than a threshold amount, such as 10% or 5%), the damage detection communication device 208 may send an indication of this result to the user and/or other entities. For instance, the damage detection communication device 208 can send the indication to the insurer's claims processing department and/or the damage detection communication device 208 can display the indication via the damage detection graphical user interface 210 (e.g., by displaying a message, such as "Proceed to Processing").

In another example, the ordered list displayed via the damage detection graphical user interface 210 may indicate to the user that the thermal conductivities of the materials measured at various areas on the automobile were not as expected (e.g., that one or more of the thermal conductivity measurements were not the same as (or within a particular threshold of) the anticipated thermal conductivities). In a further aspect, in accordance with example embodiments, one or more responsive actions may be taken by the automobile damage detection device 200. For example, similar to the results above, the automobile damage detection device 200 may store (locally and/or remotely) the results of the measurements and/or send them to another entity or entities for further processing. In another example, based on the determined thermal conductivities being sufficiently different from the anticipated thermal conductivities for those locations (e.g., deviating from the anticipated thermal conductivities by greater than a threshold amount, such as 10% or 5%), the damage detection communication device 208 may send an indication of this result to the user and/or other entities. For instance, the damage detection communication device 208 can send the indication to the insurer's claims processing department and/or the damage detection communication device 208 can display the indication via the damage detection graphical user interface 210 (e.g., by displaying a message, such as "Do Not Process Further, Call Supervisor Jones at (123) 456-7891").

In yet another example, instructions for measuring thermal conductivity at various target locations on the automobile may be displayed via the damage detection graphical user interface 210. For example, before measuring or determining one or more thermal conductivities at various target locations on the automobile, instructions for measuring and/or determining the one or more thermal conductivities at the one or more target locations on the automobile may be displayed via the damage detection graphical user interface 210. In another example, based on determining that the thermal conductivities of the materials measured at various target locations on the automobile were not as expected (e.g., a thermal conductivity measurement was excluded or a thermal conductivity measurement was outside of a particular threshold of the anticipated thermal conductivity for a particular target location on the automobile), the damage detection graphical user interface 210 may display instructions for re-measuring one or more thermal conductivities at the particular target location and/or measuring one or more thermal conductivities at one or more additional target locations on the automobile. Other examples are possible.

In still other examples, based on determining that one or more thermal conductivities of the materials measured at various areas on the automobile deviate from the one or more anticipated thermal conductivities by a threshold amount (e.g., for example, deviating by more than ±5% of the anticipated thermal conductivity for a particular target location on the automobile), the damage detection graphical user interface 210 may display an indication that the one or more determined thermal conductivities deviates from the one or more anticipated thermal conductivities by the threshold amount. Other displayed results, lists, and configurations are possible (e.g., the damage detection communication device 208 and/or the damage detection graphical user interface 210 may be integrated into the damage detection sensor 202, among other possibilities).

C. Example Automobile Damage Detection Environment

Figure 3A:
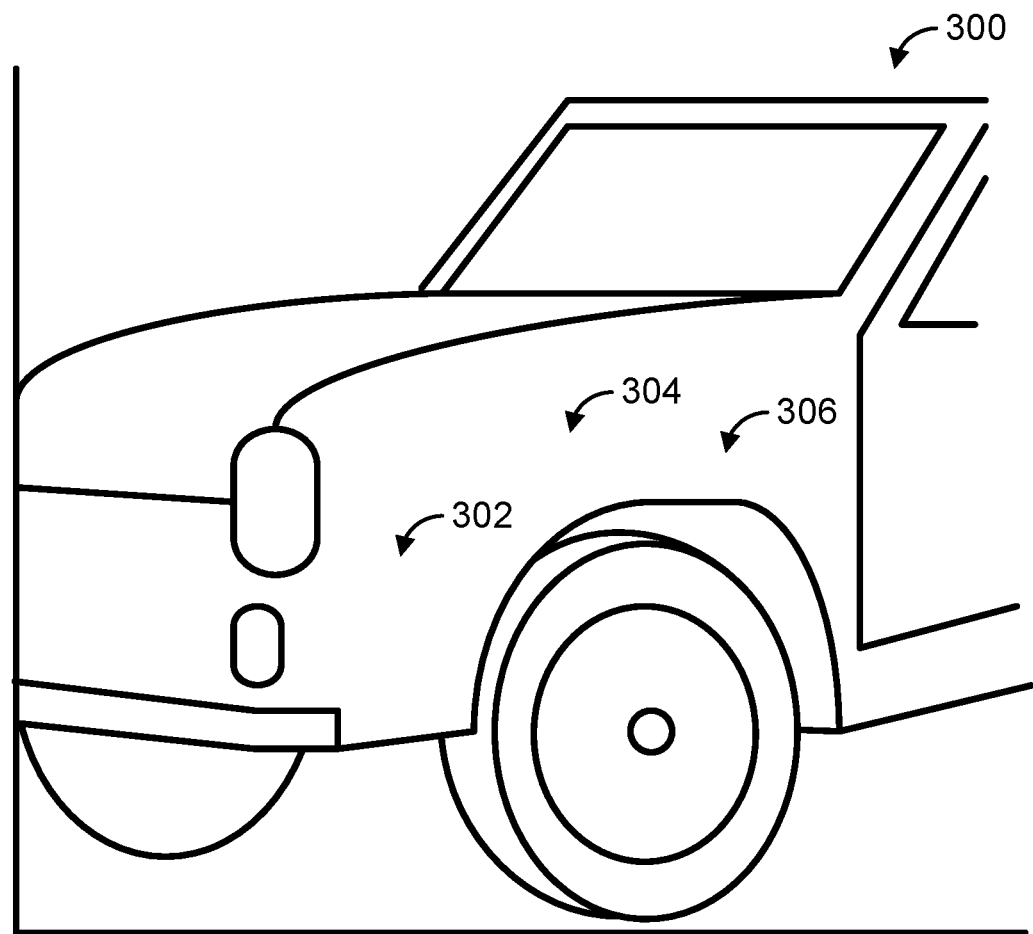
FIG. 3A is an example automobile damage detection environment in a first state.
Figure 3B:
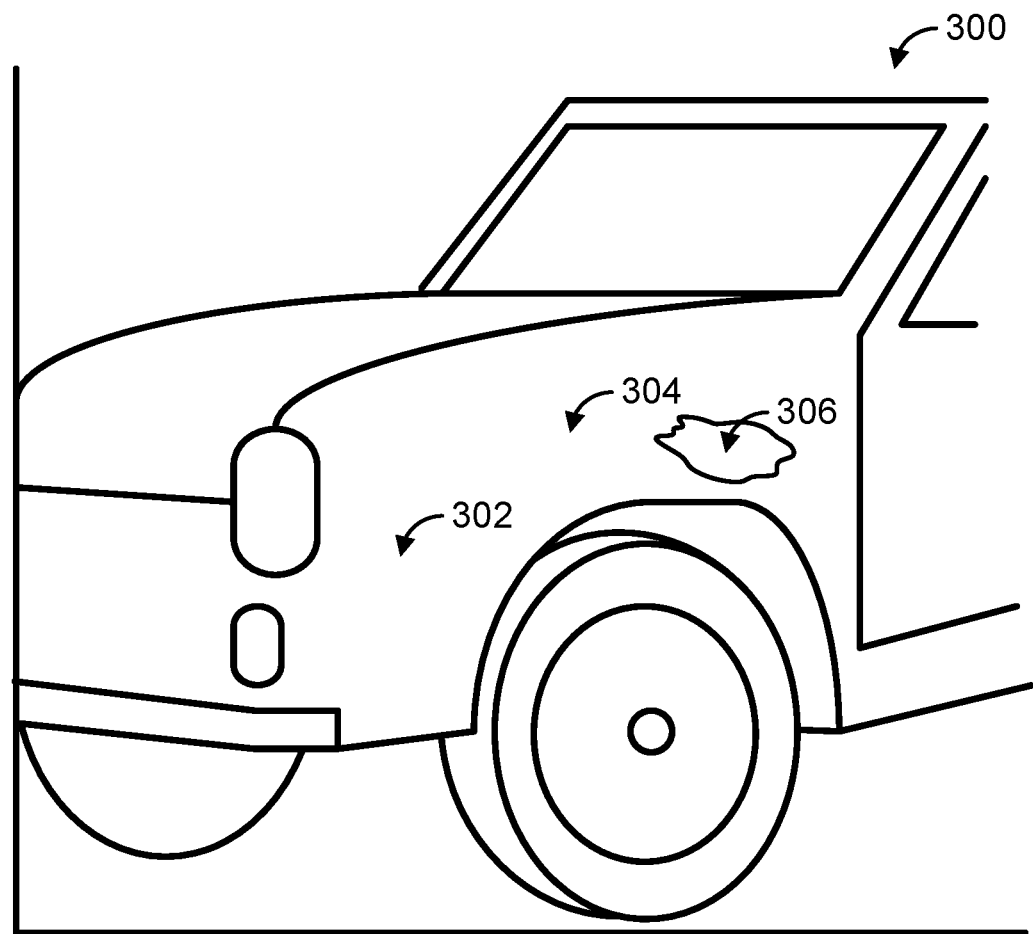
FIG. 3B is the example automobile damage detection environment of 3A, but in a second state.

To further illustrate the above-described concepts and others, FIGS. 3A-3B depict an example environment in which the example automobile damage detection device 200 depicted in FIG. 2 (as well as other configurations of automobile damage detection device 200) can be used. Like FIG. 2, these example environments are merely for purposes of illustration. The features described herein may involve environments and vehicles that are configured or formatted differently, include additional or fewer components and/or more or less data, include different types of components and/or data, and relate to one another in different ways.

Turning to FIG. 3A, FIG. 3A depicts an example automobile damage detection environment 300 in a first state. Environment 300 includes an automobile with three target locations on the driver-side front fender, shown here as first target location 302, second target location 304, and third target location 306. In this example embodiment, in this first state, first target location 302, second target location 304, and third target location 306 are not damaged and contain only original materials used by the automobile manufacturer when manufacturing the fender.

Turning back to FIG. 2, to measure the respective thermal conductivities of first target location 302, second target location 304, and/or third target location 306, a user may use automobile damage detection device 200. In this example first state, after the user has measured some or all of the three target locations, the automobile damage detection device 200 may notify the user (e.g., via an ordered list displayed via the damage detection graphical user interface 210) that the thermal conductivities of the materials measured at first target location 302, second target location 304, and third target location 306 on the automobile were as expected (e.g., the thermal conductivity measurements at the first target location 302, the second target location 304, and the third target location 306 were the same as (or within a particular threshold of) the anticipated thermal conductivities for those locations).

As described above and as described in further detail below, one or more of several responsive actions may be taken by the automobile damage detection device 200 to apprise the user and/or others of this information (e.g., the damage detection communication device 208 may alert the insurer's claims processing department to disburse payment under the claim).

Turning to FIG. 3B, the example automobile damage detection environment 300 is shown in a second state, in which the automobile has the same three distinct target locations on the driver-side front fender, with the first and second target locations 302 and 304, in the same state as the first state, but with the third target location 306 in a second state. Specifically, in FIG. 3B, in this second state, unlike FIG. 3A, the third target location 306 has been damaged and contains non-original materials (e.g., materials used to repair the damage, including resin fillers such as "Bondo®"). Furthermore, while the non-original material at the third target location 306 is visually illustrated in FIG. 3B (shown as the squiggly line portion surrounding the third target location 306), the presence of the non-original material may not be as immediately apparent to someone inspecting the automobile for damage in other ways (e.g., by simple visual inspection).

In this second state, when the automobile damage detection device 200 measures the respective thermal conductivities of first target location 302, second target location 304, and/or third target location 306, the automobile damage detection device 200 may notify the user (e.g., via an ordered list displayed via the damage detection graphical user interface 210) that the thermal conductivities of the materials measured at first target location 302 and second target location 304 on the automobile were as expected, but that the thermal conductivity of the materials measured at third target location 306 were not. As described above and as described in further detail below, one or more of several responsive actions may also be taken by the automobile damage detection device 200 to apprise the user and/or others of this information as well.

To further illustrate the above-described concepts and others, FIGS. 4A-4D depict graphical user interfaces, in accordance with example embodiments. Each of these graphical user interfaces may be provided for display by the automobile damage detection device 200 (e.g., via the damage detection graphical user interface 210), among other possibilities. The information displayed by the graphical user interfaces may also be derived, at least in part, from data stored and processed by the components described in connection with the automobile damage detection device 200, and/or other computing devices or systems configured to generate such graphical user interfaces and/or receive input from one or more users. These graphical user interfaces are merely for purposes of illustration. The features described herein may involve graphical user interfaces that format information differently, include more or less information, include different types of information, and relate to one another in different ways.

Further, FIGS. 4A-4D depict graphical user interfaces that display various types of information in a manner to help assess damage to an automobile in the context of previous, ongoing, and prospective claims relating to an insurance policy. This information may also provide an up-to-date visual representation of the extent of damage an automobile may have (e.g., compared to previous thermal conductivity measurements for that automobile and/or other similar automobiles), which in turn may allow for more accurate assessments by the insurance company. Thus, these graphical user interfaces may allow employees of the insurance company and/or a support entity to better determine the extent of damage to an automobile at any given time.

Figure 4A:
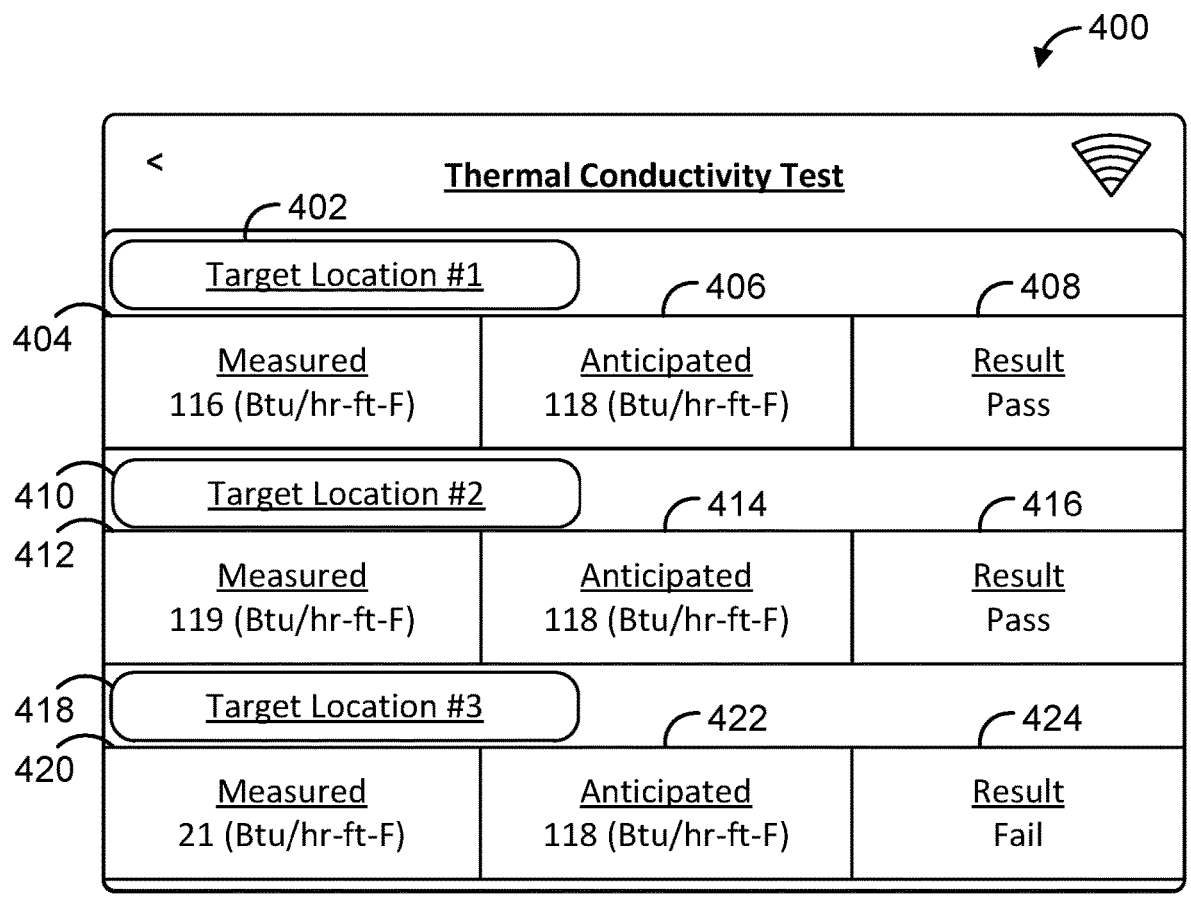
FIG. 4A is an example graphical user interface in a first state.

Turning to FIG. 4A, FIG. 4A depicts an example graphical user interface 400 in a first state. Interface 400 includes visual alerts that notify the user that thermal conductivity measurements have been made and compared to anticipated thermal conductivity measurements at various locations on an automobile (e.g., at first target location 302, second target location 304, and third target location 306, as illustrated in FIGS. 3A-B above).

Specifically, in the context of FIG. 4A, these alerts include information concerning the thermal conductivity measurements at the first target location, including a first target location label 402 (shown here as "Target Location #1"), a first target location determined thermal conductivity 404 (shown here as "Measured 116 (Btu/hr-ft-F)"), a first target location anticipated thermal conductivity 406 (shown here as "Anticipated 118 (Btu/hr-ft-F)"), and a first target location comparison result 408 (shown here as "Result Pass," which may be based on one or more predetermined rules for the comparison). For example, the comparison result 408 may be the result of determining whether the first target location determined thermal conductivity 404 falls within a certain tolerance of the first target location anticipated thermal conductivity 406 (e.g., ±5% of the anticipated thermal conductivity) and if the answer is yes (as it is here for "Target Location #1"), the result "Pass" may be displayed).

Similar information is also displayed for the second target location 304, including second target location label 410, second target location determined thermal conductivity 412, second target location anticipated thermal conductivity 414, and second target location comparison result 416 (shown here as "Result Pass"). And similar information is further displayed for the third target location, including third target location label 418, third target location determined thermal conductivity 420, third target location anticipated thermal conductivity 422, and third target location comparison result 424 (shown here as "Result Fail"). Again, this third target location comparison result 424 may be the result of determining whether the third target location determined thermal conductivity 420 falls within a certain tolerance of the third target location anticipated thermal conductivity 422 (e.g., ±5% of the anticipated thermal conductivity) and if the answer is no (as it is here for "Target Location #3"), the result "Fail" may be displayed).

Similar to FIG. 4A, FIG. 4B shows the graphical user interface 400 of FIG. 4A, but in a second state that results from an inconclusive thermal conductivity measurement for a particular location. An inconclusive thermal conductivity measurement may arise when the automobile damage detection device 200 is unable to determine a thermal conductivity measurement for a target location (e.g., due to device and/or user malfunction). In the second state, because the thermal conductivity measurement for a particular target location (here, "Target Location #3") was not sufficiently attained, the user is prompted with a third target location corrective measurement instruction 426 (shown here as "REPEAT MEASUREMENT"), as the third target location anticipated thermal conductivity 428 cannot be compared to a determined thermal conductivity for the third target location, resulting in a third target location corrective comparison result 430 (shown here as "Inconclusive"). In this way, the user may be apprised of insufficient measurements to comport with the predetermined protocol of the automobile damage detection device 200 and responsively prompted to take ameliorative action to correct the insufficient measurement (and given instructions to do so).

Referring next to FIG. 4C, FIG. 4C shows the graphical user interface 400 of FIGS. 4A-B, but in a third state in which the thermal conductivity measurements for all three target locations are both conclusive and sufficiently similar to their anticipated thermal conductivities. In the third state, because the thermal conductivity measurements for all three target locations (including "Target Location #3") were sufficiently attained and all within a certain, predetermined threshold of an anticipated result or results (i.e., all three do not deviate from the one or more anticipated thermal conductivities by a threshold amount), the user is prompted with similar, positive results for all three target locations. For instance, with respect to the third target location, the graphical user interface 400 displays third target location determined thermal conductivity 432 (shown here as "Measured 116 (Btu/hr-ft-F)"), third target location anticipated thermal conductivity 434 (shown here as "Anticipated 118 (Btu/hr-ft-F)"), and third target location comparison result 436 (shown here, for the first time, as "Result Pass").

Figure 4D:
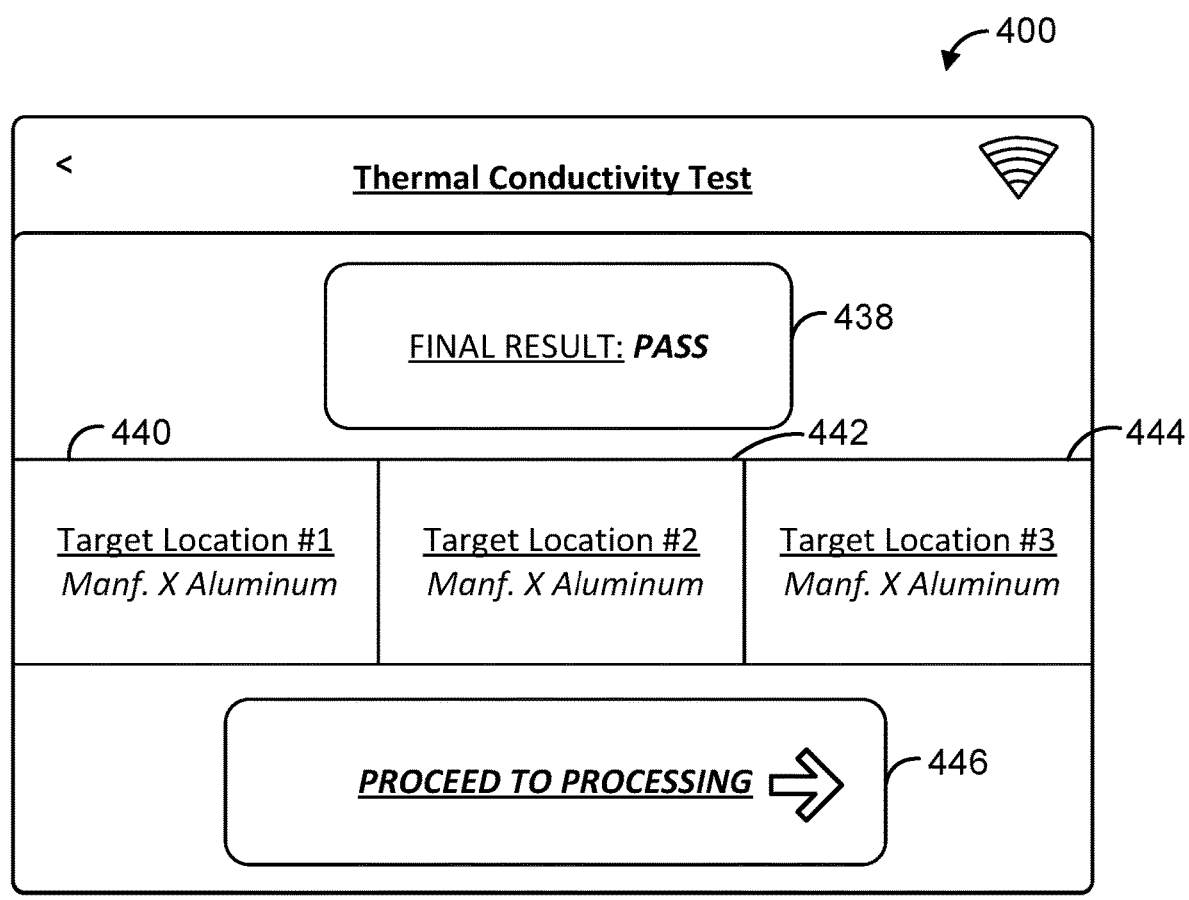
FIG. 4D is the example graphical user interface of FIG. 4A, but in a fourth state.

Referring next to FIG. 4D, FIG. 4D shows the graphical user interface 400 of FIGS. 4A-C, but in a fourth state. Specifically, FIG. 4D shows the graphical user interface 400 displaying a cumulative comparison result 438 that indicates that the cumulative result of all three underlying comparative results (e.g., the first, second, and third target locations comparison results shown in FIG. 4C) is a final "Pass" result and provides the user with follow-on instructions and/or information.

For example, as illustrated in FIG. 4D, information concerning the underlying materials measured and analyzed for all three target locations is displayed by the graphical user interface 400. To facilitate this, the automobile damage detection device 200 can determine, based on the measured thermal conductivities at the first, second, and third target locations, a type of the material at the first, second, and third locations. For instance, based on the determined thermal conductivities being sufficiently similar to an anticipated thermal conductivity of a particular type of metal (e.g., aluminum used by a particular automobile manufacturer), the automobile damage detection device 200 may cause the graphical user interface 400 to display an indication that the material at the first, second, and third target locations has been identified as the particular type of metal (shown here as "Manf. X Aluminum" for first target location material information 440, second target location material information 442, and third target location material information 444). The graphical user interface 400 may also display follow-on instructions 446 based on this result (shown here as "Proceed to Processing"). Again, these example graphical user interfaces are merely for purposes of illustration. The features described herein may involve graphical user interfaces that are configured or formatted differently, include more or less information and/or additional or fewer instructions, include different types of information and/or instructions, and relate to one another in different ways.

Figure 5:
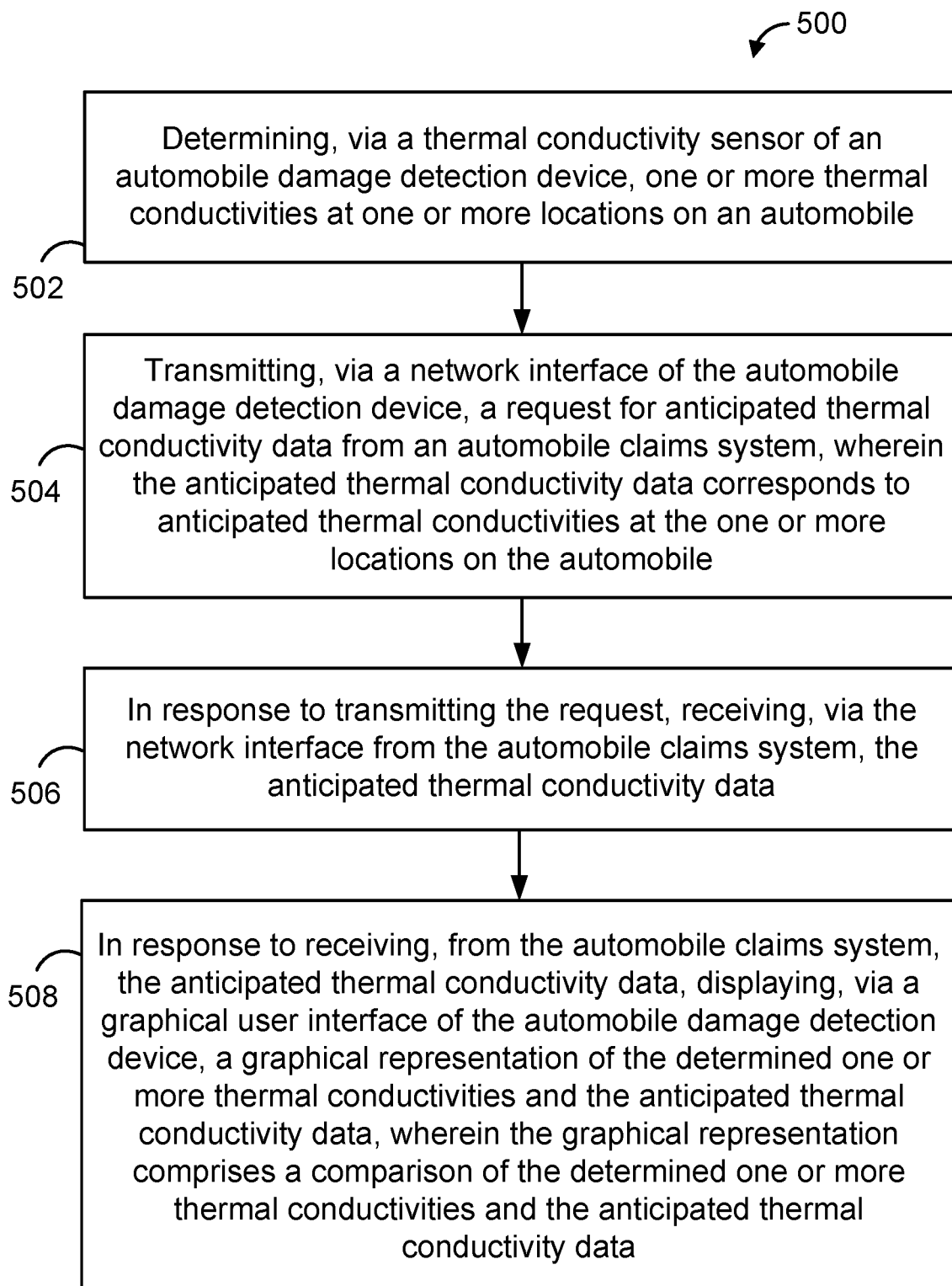
FIG. 5 is a flow chart of an example method.

FIG. 5 is a flow chart illustrating an example method 500.

At block 502, the method 500 can include determining, via a thermal conductivity sensor of an automobile damage detection device, one or more thermal conductivities at one or more locations on an automobile. In some examples, determining, via the thermal conductivity sensor, the one or more thermal conductivities, comprises determining the one or more thermal conductivities via direct contact between the thermal conductivity sensor and the one or more locations on the automobile. In other examples, determining, via the thermal conductivity sensor, the one or more thermal conductivities, comprises determining the one or more thermal conductivities via indirect contact between the thermal conductivity sensor and the one or more locations on the automobile. In still other examples, the thermal conductivity sensor indirectly contacts the one or more locations on the automobile through a predetermined layer of intermediate material between the thermal conductivity sensor and the one or more locations on the automobile.

At block 504, transmitting, via a network interface of the automobile damage detection device, a request for anticipated thermal conductivity data from an automobile claims system, wherein the anticipated thermal conductivity data corresponds to anticipated thermal conductivities at the one or more locations on the automobile. In some examples, the anticipated thermal conductivity data comprises one or more previously determined thermal conductivities of the automobile. In other examples, the anticipated thermal conductivity data comprises one or more thermal conductivities of a second automobile having one or more attributes in common with the automobile.

At block 506, the method 500 can include in response to transmitting the request, receiving, via the network interface from the automobile claims system, the anticipated thermal conductivity data.

At block 508, the method 500 can include, in response to receiving, from the automobile claims system, the anticipated thermal conductivity data, displaying, via a graphical user interface of the automobile damage detection device, a graphical representation of the determined one or more thermal conductivities and the anticipated thermal conductivity data, wherein the graphical representation comprises a comparison of the determined one or more thermal conductivities and the anticipated thermal conductivity data. In some examples, the graphical representation comprises an ordered list comparing the determined one or more thermal conductivities and the anticipated thermal conductivity data.

In some examples, the method 500 can include, prior to determining the one or more thermal conductivities, displaying, via the graphical user interface, a graphical representation of instructions for determining the one or more thermal conductivities at the one or more locations on the automobile.

In other examples, the method 500 can include determining that the one or more determined thermal conductivities deviates from the one or more anticipated thermal conductivities by a threshold amount, wherein the comparison of the determined one or more thermal conductivities and the anticipated thermal conductivity data comprises an indication that the one or more determined thermal conductivities deviates from the one or more anticipated thermal conductivities by the threshold amount.

In still other examples, the method 500 can further include, based on the anticipated thermal conductivity data, determining that the determined one or more thermal conductivities exclude a thermal conductivity corresponding to the anticipated thermal conductivity data, displaying, via the graphical user interface, instructions for determining an additional thermal conductivity at an additional location on the automobile corresponding to the excluded thermal conductivity, determining, via the thermal conductivity sensor, the additional thermal conductivity at the additional location on the automobile, and in response to determining the additional thermal conductivity, displaying, via the graphical user interface, a graphical representation of the determined one or more thermal conductivities, the anticipated thermal conductivity data, and the determined additional thermal conductivity, wherein the graphical representation comprises a comparison of the determined one or more thermal conductivities, the anticipated thermal conductivity data, and the determined additional thermal conductivity.

V. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

We claim:

1. An automobile damage detection device, comprising:
   a thermal conductivity sensor;
   a graphical user interface;
   one or more processors; and
   a non-transitory, computer-readable medium storing instructions that, when executed by the processor, cause the automobile damage detection device to perform a set of acts comprising:
   determining, via the thermal conductivity sensor, one or more thermal conductivities at one or more locations on an automobile;
   based on anticipated thermal conductivity data, determining that the determined one or more thermal conductivities exclude a thermal conductivity corresponding to the anticipated thermal conductivity data; and
   displaying, via the graphical user interface, instructions for determining an additional thermal conductivity at an additional location on the automobile corresponding to the excluded thermal conductivity.

2. The automobile damage detection device of claim 1, wherein determining, via the thermal conductivity sensor, the one or more thermal conductivities, comprises determining the one or more thermal conductivities via direct contact between the thermal conductivity sensor and the one or more locations on the automobile.

3. The automobile damage detection device of claim 1, wherein determining, via the thermal conductivity sensor, the one or more thermal conductivities, comprises determining the one or more thermal conductivities via indirect contact between the thermal conductivity sensor and the one or more locations on the automobile.

4. The automobile damage detection device of claim 1, wherein the anticipated thermal conductivity data comprises one or more previously determined thermal conductivities of the automobile.

5. The automobile damage detection device of claim 1, wherein the anticipated thermal conductivity data comprises one or more thermal conductivities of a second automobile having one or more attributes in common with the automobile.

6. The automobile damage detection device of claim 1, wherein determining that the one or more determined thermal conductivities exclude a thermal conductivity corresponding to the anticipated thermal conductivity data comprises determining that the one or more determined thermal conductivities deviates from the one or more anticipated thermal conductivities by a threshold amount.

7. The automobile damage detection device of claim 1, wherein displaying instructions for determining an additional thermal conductivity at an additional location on the automobile corresponding to the excluded thermal conductivity comprises displaying a material associated with at least one of: (i) the one or more determined thermal conductivities and (ii) the one or more anticipated thermal conductivities.

8. The automobile damage detection device of claim 1, wherein the set of acts further comprises:
   prior to determining the one or more thermal conductivities, displaying, via the graphical user interface, a graphical representation of instructions for determining the one or more thermal conductivities at the one or more locations on the automobile.

9. The automobile damage detection device of claim 1, wherein the set of acts further comprises:
   determining, via the thermal conductivity sensor, the additional thermal conductivity at the additional location on the automobile; and
   in response to determining the additional thermal conductivity, displaying, via the graphical user interface, a graphical representation of at least one of: (i) the determined one or more thermal conductivities, (ii) the anticipated thermal conductivity data, and (iii) the determined additional thermal conductivity.

10. The automobile damage detection device of claim 9, wherein the graphical representation comprises a comparison of the determined one or more thermal conductivities, the anticipated thermal conductivity data, and the determined additional thermal conductivity.

11. A method comprising:
    determining, via a thermal conductivity sensor of an automobile damage detection device, one or more thermal conductivities at one or more locations on an automobile;
    based on anticipated thermal conductivity data, determining that the determined one or more thermal conductivities exclude a thermal conductivity corresponding to the anticipated thermal conductivity data; and
    displaying, via a graphical user interface of an automobile damage detection device, instructions for determining an additional thermal conductivity at an additional location on the automobile corresponding to the excluded thermal conductivity.

12. The method of claim 11, wherein determining, via the thermal conductivity sensor, the one or more thermal conductivities, comprises determining the one or more thermal conductivities via direct contact between the thermal conductivity sensor and the one or more locations on the automobile.

13. The method of claim 11, wherein determining, via the thermal conductivity sensor, the one or more thermal conductivities, comprises determining the one or more thermal conductivities via indirect contact between the thermal conductivity sensor and the one or more locations on the automobile.

14. The method of claim 11, wherein the anticipated thermal conductivity data comprises one or more previously determined thermal conductivities of the automobile.

15. The method of claim 11, wherein the anticipated thermal conductivity data comprises one or more thermal conductivities of a second automobile having one or more attributes in common with the automobile.

16. The method of claim 11, wherein determining that the one or more determined thermal conductivities exclude a thermal conductivity corresponding to the anticipated thermal conductivity data comprises determining that the one or more determined thermal conductivities deviates from the one or more anticipated thermal conductivities by a threshold amount.

17. The method of claim 11, wherein displaying instructions for determining an additional thermal conductivity at an additional location on the automobile corresponding to the excluded thermal conductivity comprises displaying a material associated with at least one of: (i) the one or more determined thermal conductivities and (ii) the one or more anticipated thermal conductivities.

18. The method of claim 11, further comprising:
prior to determining the one or more thermal conductivities, displaying, via the graphical user interface, a graphical representation of instructions for determining the one or more thermal conductivities at the one or more locations on the automobile.

19. The method of claim 11, further comprising:
determining, via the thermal conductivity sensor, the additional thermal conductivity at the additional location on the automobile; and
in response to determining the additional thermal conductivity, displaying, via the graphical user interface, a graphical representation of at least one of: (i) the determined one or more thermal conductivities, (ii) the anticipated thermal conductivity data, and (iii) the determined additional thermal conductivity.

20. A non-transitory computer-readable medium, having stored thereon program instructions that, upon execution by a computing system, cause the computing system to perform a set of operations comprising:
determining, via a thermal conductivity sensor, one or more thermal conductivities at one or more locations on an automobile;
based on anticipated thermal conductivity data, determining that the determined one or more thermal conductivities exclude a thermal conductivity corresponding to the anticipated thermal conductivity data; and
displaying, via a graphical user interface, instructions for determining an additional thermal conductivity at an additional location on the automobile corresponding to the excluded thermal conductivity.

\* \* \* \* \*